United States Patent
Alemany et al.

(10) Patent No.: US 8,703,670 B2
(45) Date of Patent: Apr. 22, 2014

(54) IONIC LIQUIDS HAVING A CONTENT OF IONIC POLYMERS

(75) Inventors: Aurelie Alemany, Stuttgart (DE); Dirk Gerhard, Mannheim (DE); Bolette Urtel, Bobenheim-Roxheim (DE)

(73) Assignee: BASF SE, Ludwigshafen (DE)

( * ) Notice: Subject to any disclaimer, the term of this patent is extended or adjusted under 35 U.S.C. 154(b) by 341 days.

(21) Appl. No.: 13/188,760

(22) Filed: Jul. 22, 2011

(65) Prior Publication Data

US 2012/0021957 A1 Jan. 26, 2012

Related U.S. Application Data

(60) Provisional application No. 61/439,938, filed on Feb. 7, 2011, provisional application No. 61/367,480, filed on Jul. 26, 2010.

(51) Int. Cl.
*C10M 105/00* (2006.01)

(52) U.S. Cl.
USPC ............ 508/283; 508/269; 508/271; 508/469

(58) Field of Classification Search
USPC .................................. 508/283, 269, 271, 469
See application file for complete search history.

(56) References Cited

U.S. PATENT DOCUMENTS

2009/0281008 A1  11/2009  Fujinami et al.

FOREIGN PATENT DOCUMENTS

| WO | WO 2005/113702 A1 | 12/2005 |
|----|-------------------|---------|
| WO | WO 2006/087333 A1 | 8/2006  |
| WO | WO 2008/043837 A1 | 4/2008  |

OTHER PUBLICATIONS

Ohno et al., "Development of new class of ion conductive polymers based on ionic liquids", Electrochimica Acta, 50, 2004, XP004628822, pp. 255-261.*
U.S. Appl. No. 13/569,538, filed Aug. 8, 2012, Detering, et al.
International Search Report and Written Opinion issued Jan. 31, 2012 in patent application No. PCT/EP2011/062431 filed Jul. 20, 2011 with English Translation of Category of Cited Documents.
Hiroyuki Ohno, et al., "Development of new class of ion conductive polymers based on ionic liquids", Electrochimica Acta 50, 2004, XP004628822, pp. 255-261.
Marc Uerdingen, "Ionic Liquids as Lubricants", Handbook of Green Chemistry, vol. 6, Jul. 15, 2010, XP002667129, pp. 203-219.

* cited by examiner

*Primary Examiner* — Jim Goloboy
(74) *Attorney, Agent, or Firm* — Oblon, Spivak, McClelland, Maier & Neustadt, L.L.P.

(57) ABSTRACT

Method of adjusting the viscosity of a salt having a melting point of less than 100° C. at atmospheric pressure (referred to as ionic liquid for short), wherein an oligomeric or polymeric compound which has a content of at least 0.01 mol of covalently bound acid groups/100 g of compound with at least 1% of the acid groups being present as a salt with an organic cation comprising at least one heteroatom selected from among nitrogen, oxygen, sulfur and phosphorus is added to the ionic liquid.

19 Claims, No Drawings

IONIC LIQUIDS HAVING A CONTENT OF IONIC POLYMERS

CROSS REFERENCE TO RELATED APPLICATION

This application claims the benefit under 35 USC §119(e) of U.S. provisional application No. 61/439,938, filed on Feb. 7, 2011 and of U.S. provisional application No. 61/367,480, filed on Jul. 26, 2010.

The present application incorporates by reference the provisional U.S. applications 61/367,480 and 61/439,938 submitted on Jul. 26, 2010 and Feb. 7, 2011.

The present invention relates to methods of adjusting the viscosity of a salt having a melting point of less than 100° C. at atmospheric pressure (referred to as ionic liquid for short), wherein an oligomeric or polymeric compound which has a content of at least 0.01 mol of covalently bound acid groups/100 g of compound with at least 1% of the acid groups being present as a salt with an organic cation comprising at least one heteroatom selected from among nitrogen, oxygen, sulfur and phosphorus is added to the ionic liquid.

Ionic liquids are of great interest for a wide variety of industrial uses. Apart from uses as solvent or electrolyte, uses as lubricant, hydraulic fluid or operating fluid, as heat transfer medium, for heat transport or as sealing or barrier liquid are also possible.

The use of ionic liquids as absorption medium in heat pumps, i.e. as operating fluid, is known from, for example, WO 2005/113702.

Uses of ionic liquids as hydraulic fluid, lubricant, operating fluid, barrier or sealing liquid are also mentioned in, for example, WO 2006/087333. The earlier EP Application 09169389.5 (PF 62527) which was unpublished at the priority date of the present invention also describes, inter alia, the addition of ionic compounds for adjusting the viscosity of ionic liquids.

In the abovementioned uses, suitable ionic liquids have to have a large number of required properties. One significant property in all these applications is the viscosity. It is often the case that a selected ionic liquid has many but not all of the required properties. The other properties which do not meet requirements have to be adapted appropriately if possible.

Thus, for example, the viscosity of the ionic liquid which is otherwise suitable for an intended use may not be high enough.

It is frequently also undesirable for the viscosity of a selected ionic liquid to have an excessively large temperature dependence in the temperature range of the respective use.

It is therefore desirable to have possible ways of adjusting the viscosity of any ionic liquid in a simple way, in particular to increase the viscosity and/or reduce its temperature dependence. Additives used for this purpose must have good solubility in the ionic liquid and result in homogeneous compositions.

We have accordingly found the method defined at the outset. We have also found compositions comprising ionic liquids and oligomeric or polymeric compounds and also uses of these compositions.

The Ionic Liquid

The method of the invention has the function of adjusting the viscosity of an ionic liquid by addition of a compound.

The ionic liquid is a salt having a melting point of less than 100° C. at 1 bar.

The ionic liquid preferably has a melting point of less than 70° C. and particularly preferably less than 30° C.

In a particularly preferred embodiment, the ionic liquid is liquid under normal conditions (1 bar, 21° C.).

The ionic liquid is a salt and therefore comprises at least one cation and at least one anion.

Preferred ionic liquids comprise at least one organic compound as cation, and very particularly preferably comprise exclusively organic compounds as cations.

Suitable organic cations are, in particular, organic compounds having heteroatoms such as nitrogen, sulfur, oxygen or phosphorus, particularly preferably organic compounds having a cationic group selected from among an ammonium group, an oxonium group, a sulfonium group or a phosphonium group.

In a particular embodiment, the ionic liquids are salts having ammonium cations, which term refers here to nonaromatic compounds having a localized positive charge on the nitrogen atom, e.g. compounds having tetravalent nitrogen (quaternary ammonium compounds) or compounds which have trivalent nitrogen and in which one bond is a double bond, or aromatic compounds having a delocalized positive charge and at least one nitrogen atom, preferably one or two nitrogen atoms, in the ring system.

Particularly preferred organic cations are quaternary ammonium cations having preferably three or four aliphatic substituents, particularly preferably C1-C12-alkyl groups, on the nitrogen atom.

Particular preference is also given to organic cations which comprise a heterocyclic ring system having one or two nitrogen atoms as constituent of the ring system. Monocyclic, bicyclic, aromatic or nonaromatic ring systems are possible. Mention may be made by way of example of bicyclic systems as are described in WO 2008/043837. The bicyclic systems of WO 2008/043837 are diazabicyclo derivatives, preferably made up of a 7-membered ring and a 6-membered ring, which comprise an amidinium group; mention may be made, in particular, of the 1,8-diazabicyclo[5.4.0]undec-7-enium cation.

Very particularly preferred organic cations comprise a heterocyclic ring system, preferably a five- or six-membered heterocyclic ring system having one or two nitrogen atoms as constituent of the heterocyclic ring system.

Possible cations are, for example, pyridinium cations, pyridazinium cations, pyrimidinium cations, pyrazinium cations, imidazolium cations, pyrazolium cations, pyrazolinium cations, imidazolinium cations, thiazolium cations, triazolium cations, pyrrolidinium cations and imidazolidinium cations. These cations are mentioned, for example, in WO 2005/113702. If a positive charge on the nitrogen atom or in the aromatic ring system is necessary, the nitrogen atoms are in each case substituted by a hydrogen atom or preferably by an organic group which generally has not more than 20 carbon atoms, preferably a hydrocarbon group, in particular a C1-C16-alkyl group, in particular a C1-C10-alkyl group, particularly preferably a C1-C4-alkyl group.

The carbon atoms of the ring system can also be substituted by an organic group which generally has not more than 20 carbon atoms, preferably a hydrocarbon group, in particular a C1-C16-alkyl group, in particular a C1-C10-alkyl group, particularly preferably a C1-C4-alkyl group.

Particularly preferred ammonium cations are quaternary ammonium cations, imidazolium cations, pyrimidinium cations and pyrazolium cations.

Very particular preference is given to imidazolium cations, in particular imidazolium cations of the formula I

[Structure: imidazolium cation with R4, R5 on carbons, R1 on N, R3 on N, R2 on carbon, positive charge]

where

R1 and R3 are each, independently of one another, an H atom or an organic group having from 1 to 20 carbon atoms, R2, R4 and R5 are each, independently of one another, an H atom or an organic group having from 1 to 20 carbon atoms.

R1 to R5 have the preferred meanings as indicated below for formula II.

The anion can be an organic or inorganic anion.

Possible anions are, in particular, anions from the group of halides and halogen-comprising compounds of the formulae:

$F^-$, $Cl^-$, $Br^-$, $I^-$, $BF_4^-$, $PF_6^-$, $AlCl_4^-$, $Al_2Cl_7^-$, $Al_3Cl_{10}^-$, $AlBr_4^-$, $FeCl_4^-$, $BCl_4^-$, $SbF_6^-$, $AsF_6^-$, $ZnCl_3^-$, $SnCl_3^-$, $CUCl_2^-$, $CF_3SO_3^-$, $(CF_3SO_3)_2N^-$, $CF_3CO_2^-$, $CCl_3CO_2^-$, or the group $CN^-$, $SCN^-$, $OCN^-$, $NO_2^-$, $NO_3^-$, $N(CN)^-$;

the group of sulfates, sulfites and sulfonates of the general formulae:

$SO_4^-$, $HSO_4^-$, $SO_3^{2-}$, $HSO_3^-$, $R^aOSO_3^-$, $R^aSO_3^-$;

the group of phosphates of the general formulae:

$PO_4^{3-}$, $HPO_4^{2-}$, $H_2PO_4^-$, $R^aPO_4^{2-}$, $HR^aPO_4^-$, $R^aR^bPO_4^-$;

the group of phosphonates and phosphinates of the general formulae:

$R^aHPO_3^-$, $R^aR^bPO_2^-$, $R^aR^bPO_3^-$;

the group of phosphites of the general formulae:

$PO_3^{3-}$, $HPO_3^{2-}$, $H_2PO_3^-$, $R^aPO_3^{2-}$, $R^aHPO_3^-$, $R^aR^bPO_3^-$;

the group of phosphonites and phosphinites of the general formulae:

$R^aR^bPO_2^-$, $R^aHPO_2^-$, $R^aR^bPO^-$, $R^aHPO^-$;

the group of carboxylates of the general formula:

$R^aCOO^-$;

the group of borates of the general formulae:

$BO_3^{3-}$, $HBO_3^{2-}$, $H_2BO_3^-$, $R^aR^bBO_3^-$, $R^aHBO_3^-$, $R^aBO_3^{2-}$, $B(OR^a)(OR^b)(OR^c)(OR^d)^-$, $B(HSO_4)^-$, $B(R^aSO4)^-$;

the group of boronates of the general formulae:

$R^aBO_2^{2-}$, $R^aR^bBO^-$;

the group of carbonates and carbonic esters of the general formulae:

$HCO_3^-$, $CO_3^{2-}$, $R^aCO_3^-$;

the group of silicates and silicic esters of the general formulae:

$SiO_4^{4-}$, $HSiO_4^{3-}$, $H_2SiO_4^{2-}$, $H_3SiO_4^-$, $R^aSiO_4^{3-}$, $R^aR^bSiO_4^{2-}$, $R^aR^bR^cSiO_4^-$, $HR^aSiO_4^{2-}$, $H_2R^aSiO_4^-$, $HR^aR^bSiO_4^-$;

the group of alkyl silane and aryl silane salts of the general formulae:

$R^aSiO_3^{3-}$, $R^aR^bSiO_2^{2-}$, $R^aR^bR^cSiO^-$, $R^aR^bR^cSiO_3^-$, $R^aR^bR^cSiO_2^-$, $R^aR^bSiO_3^{2-}$;

the group of carboximides, bis(sulfonyl)imides and sulfonylimides of the general formulae:

[Three structures: R^a-CO-N^--CO-R^b ; R^a-SO_2-N^--SO_2-R^b ; R^a-SO_2-N^--CO-R^b]

the group of methides of the general formula:

[Structure: central C^- bonded to SO_2-R^a, SO_2-R^c, and R^b-O_2S]

the group of alkoxides and aryl oxides of the general formula:

$R^aO^-$;

the group of halometalates of the general formula $[M_rHal_t]^{s-}$, where M is a metal and Hal is fluorine, chlorine, bromine or iodine, r and t are positive integers and indicate the stoichiometry of the complex and s is a positive integer and indicates the charge on the complex;

the group of sulfides, hydrogensulfides, polysulfides, hydrogenpolysulfides and thiolates of the general formulae:

$S^{2-}$, $HS^-$, $[S_v]^{2-}$, $[HS_v]^-$, $[R^aS]^-$, where v is a positive integer from 2 to 10; and the group of complex metal ions such as $Fe(CN)_6^{3-}$, $Fe(CN)_6^{4-}$, $MnO_4^-$, $Fe(CO)_4^-$.

In the above anions, $R^a$, $R^b$, $R^b$ and $R^d$ are each, independently of one another, hydrogen;

$C_1$-$C_{30}$-alkyl and aryl-, heteroaryl-, cycloalkyl-, halogen-, hydroxy-, amino-, carboxy-, formyl-, —O—, —CO—, —CO—O— or —CO—N<substituted derivatives thereof, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_q$ $F_{2(q-a)+(1-b)H2a+b}$ where q≤30, 0≤a≤q and b=0 or 1 (for example $CF_3$, $C_2F_5$, $CH_2CH_2—C_{(q-2)}F_{2(q-2)+1}$, $C_6F_{13}$, $C_8F_{17}$, $C_{10}F_{21}$, $C_{12}F_{25}$);

$C_3$-$C_{12}$-cycloalkyl and aryl-, heteroaryl-, cycloalkyl-, halogen-, hydroxy-, amino-, carboxy-, formyl-, —O—, —CO— or —CO—O-substituted derivatives thereof, for example cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_qF_{2(q-a)-(1-b)}H_{2a-b}$ where q≤30, 0≤a≤q and b=0 or 1;

$C_2$-$C_{30}$-alkenyl and aryl-, heteroaryl-, cycloalkyl-, halogen-, hydroxy-, amino-, carboxy-, formyl-, —O—, —CO— or —CO—O-substituted derivatives thereof, for example 2-propenyl, 3-butenyl, cis-2-butenyl, trans-2-butenyl or $C_qF_{2(q-a)-(1-b)}H_{2a-b}$ where q≤30, 0≤a≤q and b=0 or 1;

$C_3$-$C_{12}$-cycloalkenyl and aryl-, heteroaryl-, cycloalkyl-, halogen-, hydroxy-, amino-, carboxy-, formyl-, —O—, —CO— or —CO—O-substituted derivatives thereof, for example 3-cyclopentenyl, 2-cyclohexenyl, 3-cyclohexenyl, 2,5-cyclohexadienyl or $C_qF_{2(q-a)-3(1-b)}H_{2a-3b}$ where q≤30, 0≤a≤q and b=0 or 1;

aryl or heteroaryl having from 2 to 30 carbon atoms and alkyl-, aryl-, heteroaryl-, cycloalkyl-, halogen-, hydroxy-, amino-, carboxy-, formyl-, —O—, —CO— or —CO—O-substituted derivatives thereof, for example phenyl, 2-methylphenyl (2-tolyl), 3-methylphenyl (3-tolyl), 4-methylphenyl, 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-phenylphenyl, 1-naphthyl, 2-naphthyl, 1-pyrrolyl, 2-pyrrolyl, 3-pyrrolyl, 2-pyridinyl, 3-pyridinyl, 4-pyridinyl or $C_6F_{(5-a)}H_a$ where 0≤a≤5; or two radicals form an unsaturated, saturated or aromatic ring which is optionally substituted by functional groups, aryl, alkyl, aryloxy, alkyloxy, halogen, heteroatoms and/or heterocycles and optionally interrupted by one or more oxygen and/or sulfur atoms and/or one or more substituted or unsubstituted imino groups.

In the above anions, preference is given to $R^a$, $R^b$, $R^c$ and $R^d$ each being, independently of one another, a hydrogen atom or a C1-C12-alkyl group.

In the above anions, preference is given to Ra, Rb, Rc and Rd each being, independently of one another, a hydrogen atom or a C1-C12-alkyl group.

Anions which may be mentioned by way of example are chloride; bromide; iodide; thiocyanate; hexafluorophosphate; trifluormethanesulfonate; methanesulfonate; carboxylates in particular formate; acetate; mandelate; nitrate; nitrite; trifluoroacetate; sulfate; hydrogensulfate; methylsulfate; ethylsulfate; 1-propylsulfate; 1-butylsulfate; 1-hexylsulfate; 1-octylsulfate; phosphate; dihydrogenphosphate; hydrogenphosphate; C1-C4-dialkylphosphates; propionate; tetrachloroaluminate; $Al_2Cl_7—$; chlorozincate; chloroferrate; bis(trifluoromethylsulfonyl)imide; bis(pentafluoroethylsulfonyl)imide; bis(methylsulfonyl)imide; bis(p-tolylsulfonyl)imide; tris(trifluoromethylsulfonyl)methide; bis(pentafluoroethylsulfonyl)methide; p-toluenesulfonate; tetracarbonylcobaltate; dimethylene glycol monomethyl ether sulfate; oleate; stearate; acrylate; methacrylate; maleate; hydrogencitrate; vinylphosphonate; bis(pentafluoroethyl)phosphinate; borates such as bis[salicylato(2-)]borate, bis[oxalato(2-)]borate, bis[1,2-benzoldiolato(2-)-O,O']borate, tetracyanoborate, tetrafluoroborate; dicyanamide; tris(pentafluoroethyl) trifluorophosphate, tris(heptafluoropropyl) trifluorophosphate, cyclic arylphosphates such as catechoiphosphate (C6H4O2)P(O)O— and chlorocobaltate.

Particularly preferred anions are those from the group of alkylsulfates
$R^aOSO_3—$,
where $R^a$ is a C1-C12-alkyl group, preferably a C1-C6-alkyl group,
alkylsulfonates
$R^aSO_3—$;
where $R^a$ is a C1-C12-alkyl group, preferably a C1-C6-alkyl group,
halides, in particular chloride and bromide, and
pseudohalides such as thiocyanate, dicyanamide,
carboxylates $R^aCOO—$;
where $R^a$ is a C1-C20-alkyl group, preferably a C1-C8-alkyl group, in particular acetate,
phosphates,
in particular the dialkylphosphates of the formula $R^aR^bPO_4—$, where $R^a$ and $R^b$ are each, independently of one another, a C1-C6-alkyl group; in particular, $R^a$ and $R^b$ are the same alkyl group, with mention being able to be made of dimethylphosphate and diethylphosphate,
and phosphonates, in particular monoalkylphosphonic esters of the formula $R^aR^bPO_3—$, where $R^a$ and $R^b$ are each, independently of one another, a C1-C6-alkyl group.

Very particularly preferred anions are
chloride, bromide, hydrogensulfate, tetrachloroaluminate, thiocyanate, dicyanamide, methylsulfate, ethylsulfate, methanesulfonate, triflate ($CF_3SO_3—$), formate, acetate, dimethylphosphate, diethylphosphate, p-toluenesulfonate, tetrafluoroborate and hexafluorophosphate, methyl methylphosphonate and methylphosphonate.

In a preferred embodiment, the anions are anions which comprise a sulfate or sulfonate group, in particular sulfates of the formula $Z—SO_4—$ or sulfonates of the formula $Z—SO_3—$, where Z is an organic group having from 1 to 10 carbon atoms, preferably a C1-C10-alkyl group, or a fluorinated organic group (triflate) and particularly preferably a methyl or ethyl group. In the case of ionic liquids having such anions, including mixtures of such anions, e.g. any mixtures of ionic liquids having triflate, alkylsulfonates and/or alkylsulfates as anion, corrosion is often observed in contact with metals, e.g. steels, in particular nonstainless steels such as carbon-iron steels without further alloying constituents. This corrosion can be reduced by addition of the oligomeric or polymeric compound having the organic cations.

Particularly preferred ionic liquids consist exclusively of an organic cation with one of the above anions.

The molecular weight of the ionic liquids is preferably less than 2000 g/mol, particularly preferably less than 1500 g/mol, particularly preferably less than 1000 g/mol and very particularly preferably less than 750 g/mol; in a preferred embodiment, the molecular weight is in the range from 100 to 750 g/mol or in the range from 100 to 500 g/mol.

In a particular embodiment, the ionic liquids are imidazolium compounds, particularly preferably imidazolium compounds of the formula II

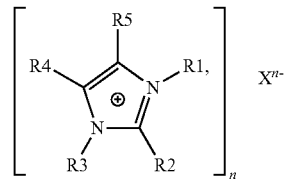

where
R1 and R3 are each, independently of one another, an H atom or an organic group having from 1 to 20 carbon atoms, R2, R4 and R5 are each, independently of one another, an H atom or an organic group having from 1 to 20 carbon atoms,
X is an anion and
n is 1, 2 or 3.

Preferably at least one of the radicals R1 and R3 is an organic group, in particular both of the radicals R1 and R3 are an organic group, in particular an organic group comprising from 1 to 10 carbon atoms. The group is particularly preferably a hydrocarbon group which has no further heteroatoms, e.g. a saturated or unsaturated aliphatic group, an aromatic group or a hydrocarbon group which has both aromatic and aliphatic parts. In particular R1 and R3 are each, independently of one another, a C1-C10-alkyl group, a C1-C10-alkenyl group, e.g. an allyl group, a phenyl group, a benzyl group; very particularly preferably R1 and R3 are each, independently of one another, a C1-C4-alkyl group, e.g. a methyl group, ethyl group, propyl group, i-propyl group or n-butyl group.

Preference is given to R2, R4 and R5 each being, independently of one another, an H atom or an organic group comprising from 1 to 10 carbon atoms. R2, R4 and R5 are particular preferably each an H atom or a hydrocarbon group which has no further heteroatoms, e.g. an aliphatic group, an aromatic group or a hydrocarbon group having both aromatic and aliphatic parts. Very particular preference is given to an H atom or a C1-C10-alkyl group, a phenyl group or a benzyl group. In particular, the substituent is an H atom or a C1-C4-alkyl group, e.g. a methyl group, ethyl group, propyl group, i-propyl group or n-butyl group. In a specific embodiment R2, R4 and R5 are an H atom.

The variable n is preferably 1.

Possible anions X and preferred anions X are those mentioned above.

Examples of possible ionic liquids which may be mentioned are those which comprise
methyltri(1-butyl)ammonium, 2-hydroxyethylammonium, 1-methylimidazolium, 1-ethylimidazolium, 1-(1-butyl)imidazolium, 1-(1-octyl)imidazolium, 1-(1-dodecyl)-imidazolium, 1-(1-tetradecyl)imidazolium, 1-(1-hexadecyl)imidazolium, 1,3-dimethylimidazolium, 1,3-diethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium or 1,4,5-trimethyl-3-octylimidazolium;
as cation and
the above anions and preferred anions
as anion.

As ionic liquids, mention may be made in particular of:
1,3-dimethylimidazolium methylsulfate, 1,3-dimethylimidazolium ethylsulfate, 1,3-dimethylimidazolium hydrogensulfate, 1,3-dimethylimidazolium dimethylphosphate, 1,3-dimethylimidazolium acetate, 1,3-dimethylimidazolium methanesulfonate, 1,3-dimethylimidazolium ethanesulfonate, 1,3-dimethylimidazolium triflate,
1,3-diethylimidazolium methylsulfate, 1,3-diethylimidazolium ethylsulfate, 1,3-diethylimidazolium hydrogensulfate, 1,3-diethylimidazolium dimethylphosphate, 1,3-diethylimidazolium acetate, 1,3-diethylimidazolium methanesulfonate, 1,3-diethylimidazolium ethanesulfonate, 1,3-diethylimidazolium triflate,
1-ethyl-3-methylimidazolium methylsulfate, 1-ethyl-3-methylimidazolium ethylsulfate, 1-ethyl-3-methylimidazolium hydrogensulfate, 1-ethyl-3-methylimidazolium thiocyanate, 1-ethyl-3-methylimidazolium acetate, 1-ethyl-3-methylimidazolium methanesulfonate, 1-ethyl-3-methylimidazolium ethanesulfonate, 1-ethyl-3-methylimidazolium triflate, 1-ethyl-3-methylimidazolium diethylphosphate, 1-(1-butyl)-3-methylimidazolium methylsulfate, 1-(1-butyl)-3-methylimidazolium hydrogensulfate, 1-(1-butyl)-3-methylimidazolium thiocyanate, 1-(1-butyl)-3-methylimidazolium acetate, 1-(1-butyl)-3-methylimidazolium methanesulfonate, 1-(1-dodecyl)-3-methylimidazolium methylsulfate, 1-(1-dodecyl)-3-methylimidazolium hydrogensulfate, 1-(1-tetradecyl)-3-methylimidazolium methylsulfate, 1-(1-tetradecyl)-3-methylimidazolium hydrogen-sulfate, 1-(1-hexadecyl)-3-methylimidazolium methylsulfate or 1-(1-hexadecyl)-3-methylimidazolium hydrogensulfate, 2-hydroxyethylammonium formate or methyltributylammonium methylsulfate.

The Compound

According to the invention, the viscosity of the ionic liquid is adjusted by addition of an oligomeric or polymeric compound.

The oligomeric or polymeric compound has a content of at least 0.01 mol, preferably 0.05 mol, particularly preferably at least 0.1 mol, in particular at least 0.2 mol and in a specific embodiment at least 0.3 mol of covalently bound acid groups per 100 g of the compound. The upper limit to the content of these acid groups is determined, depending on the type of compound, by the purely theoretical maximum possible content; in general, this content is not greater than 1.4 mol, which is almost reached, for example, in the case of polyacrylic acid, in particular not greater than 1.2 mol per 100 g of compound.

Such a high content of acid groups is generally not necessary to achieve the advantages of the invention; very good results are achieved at a low content of acid groups, as corresponds to the lower limits given above.

The above expression "100 g of the compound" relates to the oligomeric or polymeric compound as pure acid without taking into account the fact that the acid groups of the compound can have been partially or completely converted into salts with the above organic cation. Alternatively, in this application, the expression oligomeric or polymeric compound always refers in principle to the entire compound, including the cations.

The acid groups are, for example, carboxylic acid groups, sulfonic acid groups or phosphonic acid groups. Preference is given to carboxylic acid groups and sulfonic acid groups.

The oligomeric or polymeric compound is, for example, a polycondensate, a polyadduct or a polymer which can be obtained by free-radical polymerization and accordingly comprises at least partly recurring units. The oligomeric or polymeric compound therefore generally comprises, on average, at least 4, in particular at least 10, acid groups in the molecule.

The compound can for example have a molecular weight of, for example, from 300 g/mol to 250 000 g/mol.

Preferred compounds have a molecular weight of at least 500 g/mol, very particularly preferably of at least 1000 g/mol or of at least 5000 g/mol. In general, the molecular weight is not more than 200 000 g/mol, in particular not more than 150 000 g/mol. Mention may also be made, for example, of compounds having a molecular weight of from 10 000 to 150 000 g/mol or from 30 000 to 120 000 g/mol. The associated cations are not taken into account in the above molecular weight figures.

The above molecular weight is the number average molecular weight Mn, which can be determined by known methods such as gel permeation chromatography or end group determination.

The acid groups of the oligomeric or polymeric compound are at least partly or even completely present as salt with the above organic cation, i.e. carboxylic acid groups are accordingly entirely or partly present as carboxylates and sulfonic acid groups are entirely or partly present as sulfonates. Preference is given to at least 10%, in particular at least 20% or at least 50%, of the acid groups being present as salt with the organic cation. In a particular embodiment, more than 80%, in particular 100%, of the acid groups are present as salt with the organic cation.

The oligomeric or polymeric compound can be solid or liquid at room temperature (21° C.).

Preferred oligomeric or polymeric compounds are homogeneously miscible with water at 21° C. (1 bar) or have a solubility in water at 21° C. (1 bar) of at least 20 g, preferably at least 30 g, of compound in 100 g of water.

Preferred oligomeric or polymeric compounds are mentioned below.

Suitable compounds having carboxylic acid groups are, for example, poly(meth)acrylic acid or (meth)acrylic acid copolymers which comprise at least 10% by weight, in particular at least 20% by weight or at least 50% by weight, of acrylic acid or methacrylic acid ((meth)acrylic acid for short); where at least 1%, in particular at least 10%, very particularly preferably at least 20%, of the carboxylic acid groups are present as carboxylate groups with the organic cations.

Possible compounds having sulfonic acid groups are polystyrenesulfonic acid or styrenesulfonic acid copolymers comprising at least 10% by weight, in particular at least 20% by weight or at least 50% by weight, of styrenesulfonic acid; where at least 1%, in particular at least 10%, very particularly preferably at least 20%, of the sulfonic acid groups are present as sulfonate groups with the organic cation.

Further possible compounds having sulfonic acid groups are poly-2-acrylamido-2-methylpropanesulfonic acid (poly-AMPA for short) or copolymers comprising at least 10% by weight, in particular at least 20% by weight or at least 50% by weight, of 2-acrylamido-2-methylpropanesulfonic acid, where at least 1%, in particular at least 10%, very particularly preferably at least 20%, of the sulfonic acid groups are present as sulfonate groups with the organic cation.

The Organic Cation

Organic cations which form a salt with the acid groups of the oligomeric or polymeric compound comprise at least one heteroatom selected from among nitrogen, sulfur, oxygen and phosphorus. In particular, they are cations having a heterocyclic ring system in which the heteroatom or heteroatoms is/are nitrogen, sulfur, oxygen or phosphorus.

Possible organic cations are compounds having a cationic group selected from among an ammonium group, an oxonium group, a sulfonium group and a phosphonium group.

In a particular embodiment, the organic cations are ammonium cations, which for the present purposes are nonaromatic cations having a localized positive charge on the nitrogen atom, e.g. compounds having tetravalent nitrogen (quaternary ammonium compounds) or else cations having trivalent nitrogen, with one bond being a double bond, or aromatic cations having a delocalized positive charge and at least one nitrogen atom, preferably one or two nitrogen atoms, in the ring system.

Mention may be made by way of example of quaternary ammonium cations which preferably have three or four aliphatic substituents, particularly preferably C1-C12-alkyl groups, on the nitrogen atom as organic cations.

Particular preference is given to organic cations which comprise a heterocyclic ring system having at least one nitrogen atom, preferably one or two nitrogen atoms, as constituent of the ring system. Monocyclic, bicyclic, aromatic or nonaromatic ring systems are possible. Mention may be made by way of example of bicyclic systems as are described in WO 2008/043837. The bicyclic systems of WO 2008/043837 are diazabicyclo derivatives, preferably made up of a 7-membered ring and a 6-membered ring, which comprise an amidinium group; mention may be made, in particular, of the 1,8-diazabicyclo[5.4.0]undec-7-enium cation.

Very particularly preferred organic cations comprise a five- or six-membered heterocyclic ring system having one or two nitrogen atoms as constituent of the heterocyclic ring system.

Possible cations are, for example, pyridinium cations, pyridazinium cations, pyrimidinium cations, pyrazinium cations, imidazolium cations, pyrazolium cations, pyrazolinium cations, imidazolinium cations, thiazolium cations, triazolium cations, pyrrolidinium cations and imidazolidinium cations. These cations are mentioned, for example, in WO 2005/113702. If a positive charge on the nitrogen atom or in the aromatic ring system is necessary, the nitrogen atoms are in each case substituted by an H atom or preferably an organic group which generally has not more than 20 carbon atoms, preferably a hydrocarbon group, in particular a C1-C16-alkyl group, in particular a C1-C10-alkyl group, particularly preferably a C1-C4-alkyl group.

The carbon atoms of the ring system can also be substituted by organic groups which generally have not more than 20 carbon atoms, preferably a hydrocarbon group, in particular a C1-C16-alkyl group, in particular a C1-C10-alkyl group, particularly preferably a C1-C4-alkyl group.

Particular preference is given to imidazolium cations, pyrimidinium cations and pyrazolium cations.

Very particular preference is given to imidazolium cations.

Particularly preferred imdazolium cations are those of the formula I, which corresponds to the imidazolium cation in the above formula II:

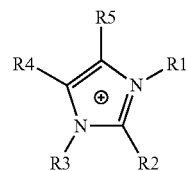

R1 to R5 have the above meanings given for formula II.

In a particular embodiment, the cation of the ionic liquid is identical to the cation of the oligomeric or polymeric compound; in particular, the cations can be identical imidazolium cations.

Preparation of the Oligomeric or Polymeric Compound

Poly(meth)acrylic acid or (meth)acrylic acid copolymers can be obtained by free-radical polymerization, in particular by solution polymerization or bulk polymerization, of acrylic acid or methacrylic acid and in the case of the copolymers of further free-radically polymerizable monomers.

Possible (meth)acrylic acid copolymers are ones having any comonomers, e.g. one or more comonomers selected from among acrylic esters, vinyl esters, vinyl ethers, vinylaromatics such as styrene, olefins such as ethylene or propylene or vinyl halides. The comonomers can comprise functional groups, e.g. the acid groups, acid amide groups or hydroxyl groups mentioned as obligatory above or other functional groups.

Preference is given to poly(meth)acrylic acid or (meth)acrylic acid copolymers of acrylic acid or methacrylic acid with maleic acid or maleic anhydride. Poly(meth)acrylic acid and (meth)acrylic acid copolymers are marketed, for example, by BASF under the trade name Sokalan®.

The conversion of the acid groups into the corresponding salt groups with the organic cation can be carried out in a known way. For this purpose, the oligomeric or polymeric compound can be dissolved in a suitable solvent, e.g. water, and the desired organic cation can be added as salt with a basic anion, e.g. hydroxide or methylcarbonate. This is a simple neutralization of the acid by means of the basic salt and the acid groups are thereby converted into the salt groups with the organic cation. The solvent and the neutralization product formed (e.g. water, methanol) can, if desired, subsequently be removed. As an alternative, the acid groups of the monomers can also be converted into the desired salt groups, and the oligomeric or polymeric compound can subsequently be prepared by polymerization or copolymerization of the monomers having salt groups. Mention may also be made of the possibility of polymerizing monomers having acid groups in the presence of a basic salt of the organic cation, in which case the preparation of the compound and the conversion into the corresponding salt groups occur in one step.

Adjustment of the Viscosity and the Compositions

In the following, the term ionic liquid encompasses a mixture of ionic liquid and the term compound encompasses a mixture of various oligomeric or polymeric compounds.

The oligomeric or polymeric compound is preferably added to the ionic liquid in an amount of from 0.1 to 35 parts by weight, in particular from 0.1 to 30 parts by weight per 100 parts by weight, particularly preferably in amounts of from 1 to 25 parts by weight, in particular from 1 to 20 parts by weight and very particularly preferably in amounts of from 2 to 20 parts by weight, in particular from 2 to 15 parts by weight per 100 parts of ionic liquid. The compound has good solubility in the ionic liquid, making the resultant compositions always homogeneous.

The viscosity of the ionic liquid is increased by the addition of the compound.

The compound can be added to the pure ionic liquid but can also be added to mixtures comprising not only the ionic liquid but also further materials; these can be, for example, materials such as solvents or materials dissolved in the ionic liquid. Such mixtures can be formed, for example, during a use of ionic liquids. It is therefore also an advantage of the method of the invention that the viscosity can be increased or adapted by addition of the compound during the use of the ionic liquid (see below).

In a particularly preferred embodiment, a further, nonionic solvent can be additionally added to the ionic liquid. This is preferably a solvent which is homogeneously miscible with the ionic liquid at 21° C. (1 bar) and has a dielectric constant of greater than 7.5 at 21° C., 1 bar.

Preferred solvents are polar aliphatic solvents having hydroxyl groups or ether groups.

As preferred solvents, mention may be made of, in particular, water and methanol or mixtures thereof.

The amount of nonionic solvent, in particular water or methanol, is preferably at least 1 part by weight, in particular at least 5 parts by weight, particularly preferably at least 10 parts by weight and very particularly preferably at least 20 parts by weight, per 100 parts by weight of ionic liquid.

The nonionic solvent can preferably be added to the ionic liquid in amounts of from 1 to 150 parts by weight, particularly preferably from 5 to 100% by weight and very particularly preferably from 10 to 80 parts by weight, in particular from 20 to 60 parts by weight, per 100 parts by weight of ionic liquid.

As regards the manner and point in time of the addition, what has been said above in respect of addition of the compound applies here.

The addition of the nonionic solvent may reduce the temperature dependence of the viscosity, which is important for many applications having a broad temperature range. In particular, the viscosity increase is still very noticeable even at high temperatures.

The addition according to the invention of the compound to the ionic liquid makes it possible to obtain compositions which comprise an ionic liquid and the above compound. It is likewise possible to obtain compositions which comprise an ionic liquid, the above compound and the above solvent.

The compositions of the invention can, in particular, comprise further additives which are necessary or helpful in the intended use of the composition. These can be, for example, corrosion inhibitors, antifoams, extreme pressure additives or antiwear additives. Extreme pressure additives prevent the fusion of 2 metallic materials under high pressure; antiwear additives reduce abrasion or wear in the case of high friction or load.

The compositions can comprise more than 70% by weight, in particular more than 90% by weight and particularly preferably more than 95% by weight, or more than 98% by weight or exclusively (100% by weight) (of) the ionic liquid, the oligomeric or polymeric compound and, if used, the solvent. This is particularly the case before use of the compositions; during use, further materials can be present in the composition, depending on the type of use.

The viscosity of the composition is—in the case where it comprises more than 90% by weight of the ionic liquid, the compound and the solvent—preferably from 10 mPa*s to 2500 mPa*s at 20° C. The viscosity indicated is the dynamic viscosity.

In a preferred embodiment, the composition of the invention comprises 100 parts by weight of ionic liquid, which can be one ionic liquid or a mixture of ionic liquids, and from 0.1 to 40 parts by weight, in particular from 0.5 to 30 parts by weight, particularly preferably from 0.5 to 20 parts by weight, of oligomeric or polymeric compound, from 0 to 150 parts by weight, in particular from 0 to 60 parts by weight, particularly preferably from 0 to 30 parts by weight, of nonionic solvents and from 0 to 40 parts by weight, in particular from 0 to 20 parts by weight and particularly preferably from 0 to 10 parts by weight, of other additives, e.g. above-mentioned additives.

In a particularly preferred embodiment, the composition of the invention comprises nonionic solvents in the minimum amounts indicated above.

The composition of the invention is suitable for a wide variety of uses. Mention may be made of, for example, uses as lubricant, hydraulic fluid, operating fluid in apparatuses, e.g.

as absorption medium in thermodynamic cyclic processes based on absorption and desorption, as heat transfer medium, for heat transport or as sealing or barrier liquid. The compositions are homogeneous since the oligomeric or polymeric compound added has good solubility in the ionic liquid. In particular, it was also found that the compositions of the invention display reduced corrosion even without additional corrosion inhibitors. The oligomeric or polymeric compound having the organic cations therefore acts like a corrosion inhibitor and in many cases reduces corrosion as is often observed in the case of ionic liquids, in particular in the case of ionic liquids having anions which comprise sulfate or sulfonate groups, in contact with metals, in particular non-stainless steels.

EXAMPLES

Ionic Liquid Used

The methylsulfonate of 1-ethyl-3-methyl-imidazolium (EMIM) was used as the ionic liquid: EMIM methylsulfonate (EMIM-MeSO$_3$)

Polymeric compounds used were:

Polystyrenesulfonic acid

Poly-2-acrylamido-2-methylpropanesulfonic acid (poly-AMPA for short)

Conversion of the Acid Groups of the Polymeric Compound into Salt Groups

The conversion of the acidic groups of the polymeric compound into salt groups was effected by reacting an aqueous solution of the respective polymer with 1-ethyl-3-methylimidazolium hydroxide or with a quaternary ammonium salt (hydroxide of tetrabutylammonium Bu$_4$N). The solvent was removed under reduced pressure and at elevated temperature. The acidic groups were fully converted into the corresponding salt groups. The resulting polymers having EMIM as cations are designated as follows:

EMIM polystyrenesulfonate

Bu$_4$N polystyrenesulfonate

Preparation of the Mixtures

The starting materials were mixed in the amounts indicated in the table, with the parts by weight indicated of the compound being in each case added to 100 parts by weight of the ionic liquid. Water was added to this mixture if appropriate. The viscosity of the mixtures was determined at various temperatures.

Table 1 reports the composition of the mixtures and the viscosities.

Corrosion Test

Drops of a mixture of EMIM MeSO$_3$+3% by weight of EMIM polystyrenesulfonate and for comparison of EMIM MeSO$_3$ without additive were placed on metal plates (non-stainless carbon steel, steel code 1.0036). The metal plates were stored at 90° C. in air in a drying oven for 24 hours, the metal plates were then cleaned by means of a solvent (ethanol and/or acetone) and the corrosion was assessed visually.

EMIM MeSO$_3$ alone led to distinct, corrosive changes on the surface of the metal plate. In the case of EMIM MeSO$_3$+ 3% by weight of EMIM polystyrenesulfonate, the surface displayed no damage or color changes.

TABLE 1

| | Viscosities | | | |
|---|---|---|---|---|
| IL | Water content/ % by weight | Viscosity at 20° C./ mPa * s | Viscosity at 40° C./ mPa * s | Viscosity at 100° C./ mPa * s |
| EMIM MeSO$_3$ | 10.8 | 32 | 15 | 6 |
| EMIM MeSO$_3$ + 5% Bu$_4$N polystyrenesulfonate | 8.8 | 393 | 132 | 21 |
| EMIM MeSO$_3$ + 10% EMIM polystyrenesulfonate | 10.3 | 164 | 70 | 16 |
| EMIM MeSO$_3$ + 5% EMIM AMPA | 10.6 | 192 | 85 | 20 |

The invention claimed is:

1. A method of adjusting the viscosity of a salt having a melting point of less than 100° C. at atmospheric pressure (referred to as ionic liquid for short), wherein an oligomeric or polymeric compound which has a content of at least 0.01 mol of covalently bound acid groups/100 g of compound with at least 1% of the acid groups being present as a salt with an organic cation comprising at least one heteroatom selected from among nitrogen, oxygen, sulfur and phosphorus is added to the ionic liquid.

2. The method according to claim 1, wherein the ionic liquid is a salt having an organic, heterocyclic cation having one or two nitrogen atoms as constituent of the heterocyclic ring system.

3. The method according to claim 1 or 2, wherein the ionic liquid is a salt having an imidazolium cation.

4. The method according to claim 1, wherein the oligomeric or polymeric compound added has an average of at least 4 acid groups in the molecule.

5. The method according to claim 1, wherein the content of the acid groups and salt groups derived therefrom is at least 0.1 mol/100 g of compound.

6. The method according to claim 1, wherein the acid groups are carboxylic acid groups or sulfonic acid groups and the salt groups derived therefrom are correspondingly carboxylate groups or sulfonate groups.

7. The method according to claim 1, wherein the oligomeric or polymeric compound is poly(meth)acrylic acid or a (meth)acrylic acid copolymer comprising at least 10% by weight of (meth)acrylic acid, where at least 1% of the acid groups are present as carboxylate groups with the organic cation.

8. The method according to claim 1, wherein the oligomeric or polymeric compound is polystyrenesulfonic acid, poly-2-acrylamido-2-methylpropanesulfonic acid, a styrene-sulfonic acid copolymer comprising at least 10% by weight of styrene-sulfonic acid or a 2-acrylamido-2-methylpropane-sulfonic acid copolymer comprising at least 10% by weight of 2-acrylamido-2-methylpropanesulfonic acid,
where at least 1% of the acid groups are present as sulfonate groups with the organic cation.

9. The method according to claim 1, wherein the organic cation is a cation having a heterocyclic ring system.

10. The method according to claim 9, wherein the ring of the heterocyclic ring system is a ring having at least one nitrogen atom.

11. The method according to claim 1, wherein the organic cation is a cation selected from the group consisting of a pyridinium cation, a pyridazinium cation, a pyrimidinium cation, a pyrazinium cation, an imidazolium cation, a pyrazolium cation, a pyrazolinium cation, an imidazolinium cation, a thiazolium cation, a triazolium cation, a pyrrolidinium cation, and an imidazolidinium cation.

12. The method according to claim 1, wherein the organic cation is an imidazolium cation represented by formula (I)

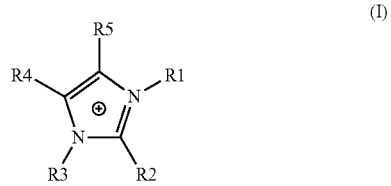

wherein:
each of R1 and R3 are each, independently, represents an H atom or an organic group having from 1 to 20 carbon atoms, each of R2. R4 and R5, independently, represents an H atom or an organic group having from 1 to 20 carbon atoms.

13. The method according to claim 1, wherein the cation of the ionic liquid is identical to the organic cation of the added compound.

14. The method according to claim 1, wherein the oligomeric or polymeric compound is homogeneously miscible with water at 21° C. (1 bar) or has a solubility in water at 21° C. (1 bar) of at least 20 g of compound in 100 g of water.

15. The method according to claim 1, wherein the oligomeric or polymeric compound is added in an amount of from 0.1 to 30 parts by weight per 100 parts by weight of ionic liquid.

16. The method according to claim 1, wherein a solvent which is homogeneously miscible with the ionic liquid at 21° C. (1 bar) and has a dielectric constant of greater than 7.5 is additionally added to the ionic liquid.

17. The method according to claim 16, wherein the solvent is water, methanol or a mixture thereof.

18. The method according to claim 16, wherein the solvent is added in amounts of from 0.1 to 50 parts by weight per 100 parts by weight of ionic liquid.

19. A method, comprising: adding an ionic liquid having a melting point of less than 100° C. at atmospheric pressure to an apparatus, thereby using the ionic liquid as a lubricant, hydraulic fluid, operating fluid, a heat transfer medium, a heat transport, a sealing liquid or a barrier liquid in the apparatus,
wherein said ionic liquid is obtained by adding, to an ionic liquid, an oligomeric or polymeric compound which has a content of at least 0.01 mol of covalently bound acid groups/100 g of compound with at least 1% of the acid groups being present as a salt with an organic cation comprising at least one heteroatom selected from among nitrogen, oxygen, sulfur and phosphorus.

* * * * *